(No Model.)

A. D. BRYCE.
MECHANICAL MOTOR.

No. 563,556. Patented July 7, 1896.

WITNESSES:
John A. Rennie
Isaac R. Owens

INVENTOR
A. D. Bryce
BY Munn & Co
ATTORNEYS.

UNITED STATES PATENT OFFICE.

ARCHIE D. BRYCE, OF LAKE CITY, MINNESOTA.

MECHANICAL MOTOR.

SPECIFICATION forming part of Letters Patent No. 563,556, dated July 7, 1896.

Application filed August 14, 1895. Serial No. 559,285. (No model.)

*To all whom it may concern:*

Be it known that I, ARCHIE D. BRYCE, of Lake City, in the county of Wabasha and State of Minnesota, have invented a new and Improved Mechanical Motor, of which the following is a full, clear, and exact description.

This invention contemplates the use of an elastic medium and a peculiar arrangement of said medium in connection with pulleys and drums, whereby it may be wound on one or more of these pulleys or drums and made to exert its tension in such a manner as to become unwound from the first and wound on others, in this operation to produce more power than is to be ordinarily derived from the particular medium employed.

The invention will be fully described hereinafter, and finally embodied in the claims.

Reference is to be had to the accompanying drawings, forming a part of this specification, in which similar characters of reference indicate corresponding parts in all the figures.

Figure 1:
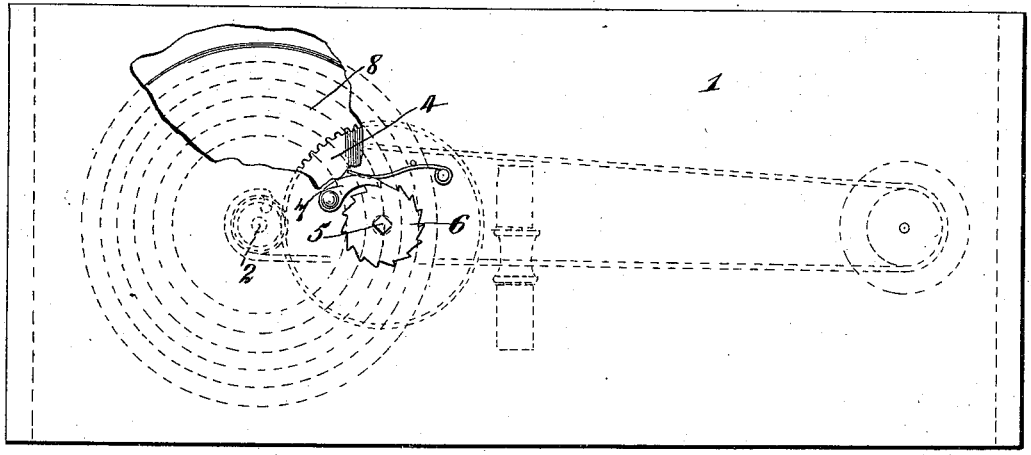
Figure 2:
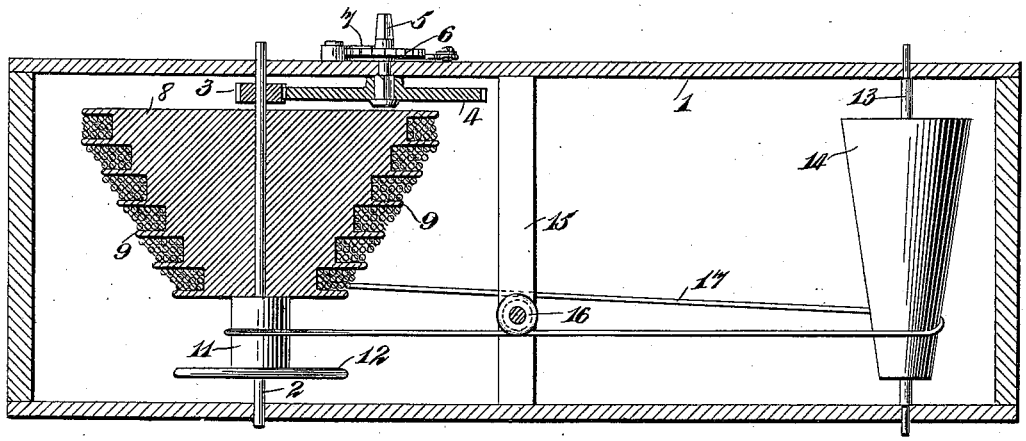
Figure 3:
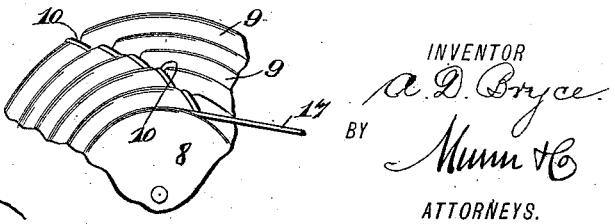

Figure 1 is a side elevation of my invention, parts being shown in dotted lines. Fig. 2 is a horizontal section of the same; and Fig. 3 is an end view of a portion of the cone, showing the notches in the flanges.

The frame 1 may be of any form, but is preferably rectangular and carries a revoluble shaft 2, on which is fixed a pinion 3, which meshes with a spur-gear 4, the same being in turn carried by a stub-shaft 5, which also carries a ratchet-disk 6 and spring-pressed pawl 7. By means of these devices the shaft 2 may be primarily wound. Also fixed on the shaft 2 is a cone 8, which is formed with a series of flanges 9, the same having each a notch 10, and these flanges are preferably seven in number, so as to form six concentric pulleys varying in size. Directly adjacent to the smaller end of the cone 8 is a drum 11, which has at its outer end a flange 12. The opposite end of the frame 1 carries a shaft 13, on which a cone 14 is fixed, while transverse bars 15 are stretched across the frame and carry an idler 16.

Fixed to the drum 11 at one end and to the largest pulley of the cone 8 is an elastic cord 17. As Fig. 2 best shows, this cord is adapted to be wound on the spool or drum 11 and on the cone 8, and in operation of my invention the cone 8 is wound so as to carry all of the cord 17. When this is done, the cord at the drum 11 will be stretched to a higher degree than at the opposite end of the cord, and the tension on the cord will therefore cause it to wind itself upon the drum 11, thereby unwinding the cord from the cone 8.

By means of my improvement the elasticity of the cord 17 is better directed and applied and made to serve a more useful purpose than in other devices, it being understood that useful power may be derived from the moving parts of the machine.

Having thus described my invention, I claim as new and desire to secure by Letters Patent—

1. The combination with a frame, of a shaft, a grooved pulley on the said shaft, a drum also located on said shaft, the said drum moving with the said shaft and pulley, an elastic cord having one terminal connected with the drum and the other terminal connected to the grooved pulley, and a guide for said cord, whereby when the elastic cord is wound upon the grooved pulley the tension on the drum end of the cord will cause said cord to unwind from the pulley and wind upon the drum revolving the said shaft, substantially as shown and described.

2. The combination with a frame, of a shaft journaled in said frame, a cone-pulley on the said shaft provided with concentric grooves forming pulleys varying in size, a drum also located on the said shaft and moving therewith and with the said pulley, an idler-pulley, and an elastic cord engaging the idler-pulley and having one terminal connected to the drum and the other terminal connected to the grooved pulley, the said cord being adapted to be wound upon itself on the grooved pulley, whereby the tension of the cord when wound upon the grooved pulley will cause the cord to wind itself upon the drum on the shaft of the grooved pulley, substantially as shown and described.

3. The combination with a frame, of a shaft, a cone-pulley on the said shaft provided with a series of concentric grooves forming pulleys varying in size, the flanges between the grooves being each provided with a notch, a drum also on the said shaft and located adjacent to the smaller end of the cone, an elastic cord having its terminals secured respectively to the largest pulley of the grooved cone and to the said drum, a second shaft carrying a cone around which the said elastic cord extends, the said cone serving to guide the elastic cord when being wound on the cone-pulley, an idler-pulley around which the said elastic cord passes, the elastic cord being adapted to be wound upon itself in the said concentric grooves of the cone-pulley, whereby the cord at the drum will be stretched to a higher degree than at the opposite end of the cord and the tension on the cord will cause it to wind itself upon the drum, thereby unwinding the cord from the cone-pulley, substantially as shown and described.

ARCHIE D. BRYCE.

Witnesses:
 FREDERICK BRUHN,
 BENJAMIN C. TORRENCE.